W. A. VINSON & R. N. McCLURE.
DIRECTION INDICATING APPARATUS FOR MOTOR VEHICLES.
APPLICATION FILED MAY 9, 1916.
1,260,735.
Patented Mar. 26, 1918.
3 SHEETS—SHEET 1.
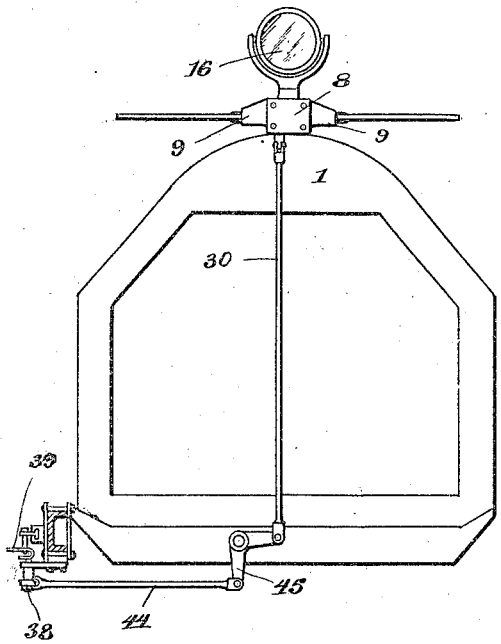
Fig. 1
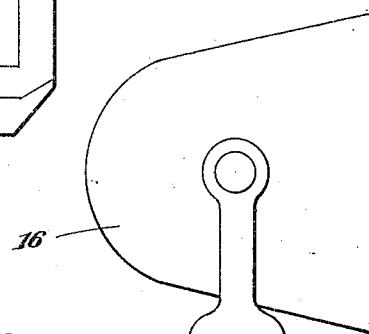
Fig. 2
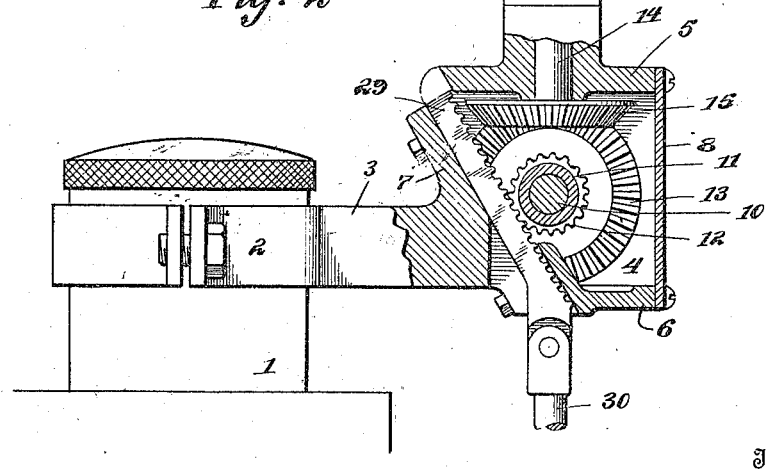
Inventor
William A. Vinson,
Rodney N. McClure,
By Victor J. Evans
Attorney
Witnesses
C. F. Rudolph
John J. McCarthy

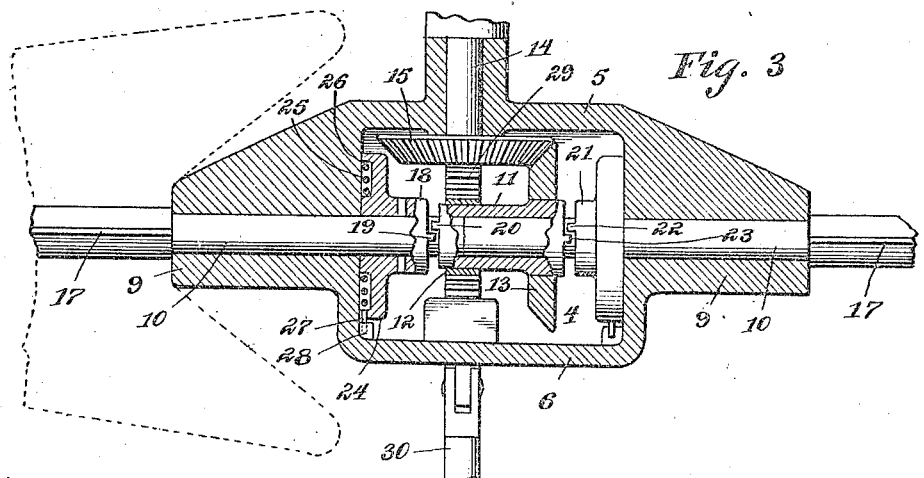
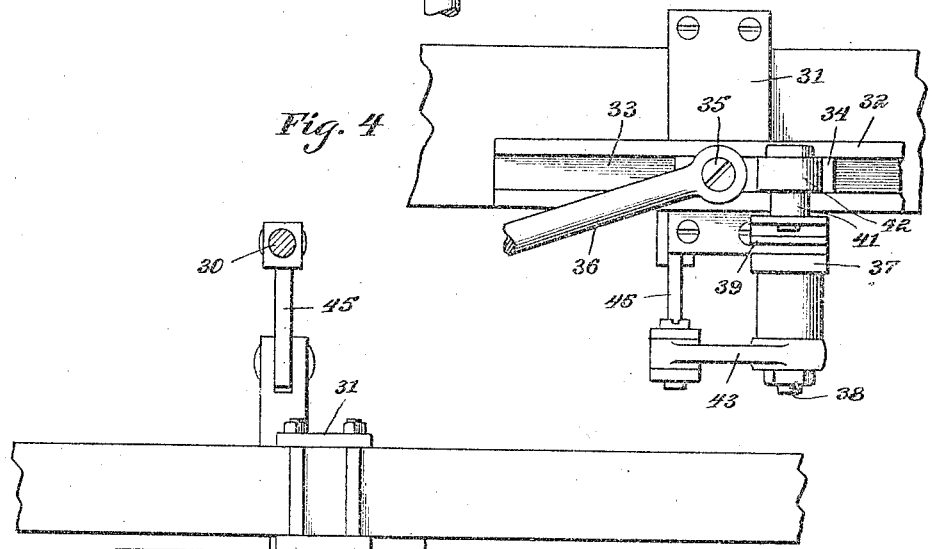
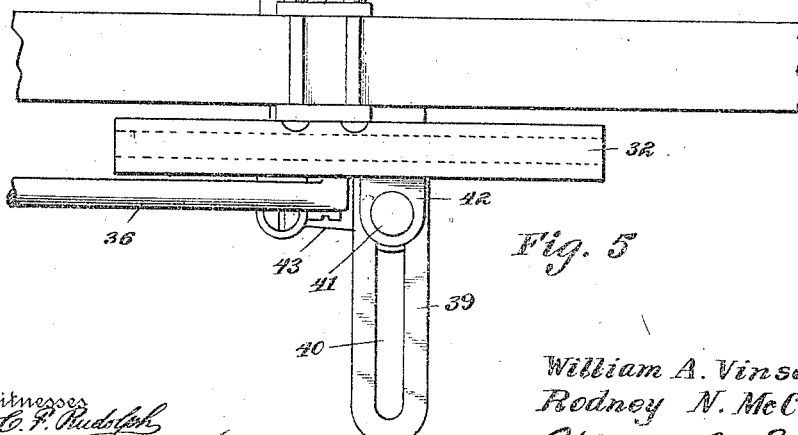

W. A. VINSON & R. N. McCLURE.
DIRECTION INDICATING APPARATUS FOR MOTOR VEHICLES.
APPLICATION FILED MAY 9, 1916.
1,260,735.
Patented Mar. 26, 1918.
3 SHEETS—SHEET 3.
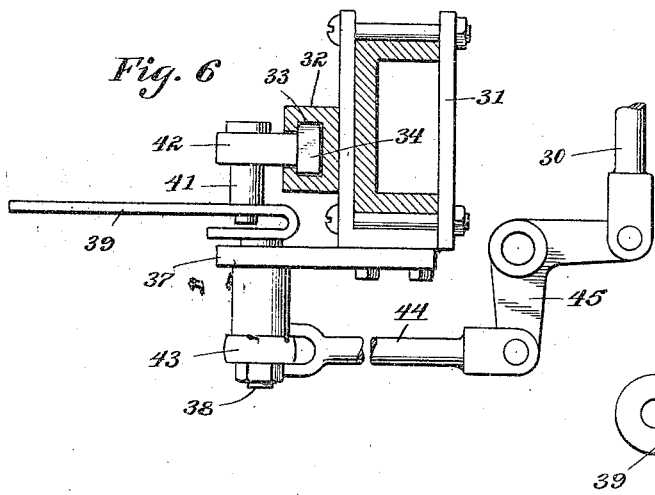
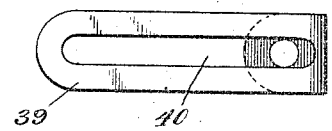
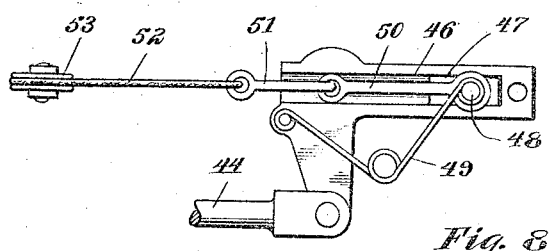
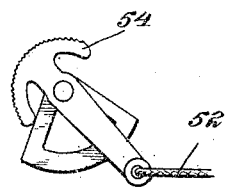
Witnesses
C. F. Rudolph
John J. McCarthy
Inventor
William A. Vinson,
Rodney N. McClure,
By Victor J. Evans
Attorney

UNITED STATES PATENT OFFICE.

WILLIAM A. VINSON AND RODNEY N. McCLURE, OF LOS ANGELES, CALIFORNIA; SAID RODNEY N. McCLURE ASSIGNOR OF ONE-SIXTH OF THE WHOLE RIGHT TO MAYME E. McCLURE.

DIRECTION-INDICATING APPARATUS FOR MOTOR-VEHICLES.

1,260,735.  Specification of Letters Patent.  Patented Mar. 26, 1918.

Application filed May 9, 1916. Serial No. 96,415.

*To all whom it may concern:*

Be it known that we, WILLIAM A. VINSON and RODNEY N. McCLURE, citizens of the United States, residing at Los Angeles, in the county of Los Angeles and State of California, have invented new and useful Improvements in Direction-Indicating Apparatus for Motor-Vehicles, of which the following is a specification.

This invention relates to improvements in direction indicating apparatus for motor vehicles and has particular application to an automatic apparatus.

In carrying out the present invention it is our purpose to provide direction indicating apparatus for motor vehicles which will be operated automatically upon the turning of the steering wheel of the vehicle to indicate the direction in which the vehicle is about to turn thereby notifying the drivers of other vehicles and pedestrians of the direction of travel of the vehicle.

It is also our purpose to provide an apparatus of the class described which will be so connected with the steering mechanism of the vehicle that the indicating blades will be operated to signaling position in the initial movement of the steering mechanism so that the signal may be given previous to the turning of the machine, and wherein the connection between the signal blades and the steering mechanism may be adjusted in order to enable the operation of the signal blade to be advanced or retarded with respect to the swinging movement of the steering wheel of the vehicle.

A further object of our invention is to provide an apparatus of the type set forth which will be effective at night as well as in the day, may be applied to any convenient or desired part of the vehicle, which will operate efficiently and effectively under all conditions, and wherein the component parts will be so arranged and correlated as to reduce the possibility of derangement to a minimum.

With the above and other objects in view, the invention consists in the construction, combination and arrangement of parts hereinafter set forth in and falling within the scope of the claims.

In the accompanying drawings,

Figure 1 is a fragmentary front elevation of a motor vehicle equipped with direction indicating apparatus constructed in accordance with our present invention.

Fig. 2 is a cross sectional view through the apparatus, the same being shown as applied to the filling nipple of the radiator.

Fig. 3 is a longitudinal sectional view through the same.

Fig. 4 is a fragmentary front elevation of the vehicle showing the control for the signal blades.

Fig. 5 is a top plan view of the same.

Fig. 6 is a cross sectional view therethrough.

Fig. 7 is a top plan view of the detail of the invention.

Fig. 8 is an enlarged side elevation showing a modified construction.

Fig. 9 is a view in side elevation of a detail.

Referring now to the drawings in detail 1 designates the forward portion of a motor vehicle, while 2 indicates a clamp surrounding the inlet nipple of the radiator and secured thereto and equipped with an arm 3 projecting forwardly of the vehicle. Mounted upon the outer end of the arm 3 and preferably, but not necessarily integral therewith is a casing 4 embodying top and bottom walls 5 and 6 respectively and an inclined back wall 7 and a removable front wall 8. The ends of the casing 4 are closed by means of bearings 9—9 respectively and journaled in these bearings are horizontally disposed axial shafts 10 arranged transversely of the vehicle and having the outer ends thereof projecting beyond the bearings and the inner ends extending into the casing and terminating in juxta-position to each other. Loosely mounted upon the inner ends of the shafts is a sleeve 11 and fixed upon one end of the sleeve 11 is a spur pinion 12 while fixed upon the other end is a beveled pinion 13. Journaled in the top wall of the casing 4 is a vertical shaft 14 having the lower end thereof equipped with a beveled pinion 15 meshing with a pinion 13 and mounted upon the upper end of the shaft 14 is a lamp 16 of some suitable construction. Fast upon the outer ends of the shafts 10 are signal blades 17 normally lying at a horizontal plane and adapted to be swung to a vertical position. Fixed upon one of the shafts 10 and disposed at one end of the sleeve 11 is a collar 18 having the inner end thereof formed with a lug 19 disposed upon one side of a lug 20 on the adjacent end of the sleeve 11 and in the path of movement of such lug 20, while fixed upon the other shaft 10 is a collar 21 arranged adjacent to the other end of the sleeve 11 and having the inner end thereof formed with a lug 22 disposed upon one side of the lug 23 formed on the adjacent end of the sleeve and in the path of movement of such lug 23, the lug 22 being disposed at the side of the lug 23 opposite from the lug 19. Fixed upon the outer end of each collar 18 is a disk 24 placed in face to face contact with the inner end of the adjacent bearing 9 and formed with an annular groove 25 in which is disposed a convoluted spring 26 having one end secured to the disk and the opposite end fastened to the adjacent bearing. Secured to the periphery of each disk 24 and projecting outwardly therefrom is a pin 27, while formed on the bottom wall of the casing is a stop lug 28 disposed in the path of movement of the pin 27. Slidably mounted upon the back inclined wall of the casing is a rack bar 29 meshing with the pinion 12 and having the lower end thereof projecting through an opening in the bottom wall of the casing and connected with the upper end of the vertical rod 30.

When the rod 30 is elevated the rack bar 29 is moved upwardly thereby rotating the pinion 12 and sleeve 11 in one direction and in this movement of the sleeve 11, the lug 20 on one end thereof engages the companion lug 19 on the collar 18 and revolves the shaft 10 with the effect to swing the blade 17 from horizontal position to vertical position and as this blade is arranged upon one side of the machine it indicates the direction in which the machine or vehicle is to be turned. In this rotation of the particular shaft 10 the spring 26 is placed under tension. When the rod 30 is restored to normal position the direction of rotation of the pinion 12 and sleeve 11 is reversed and the spring 26 reacts to restore the shaft 10 and the signal blade to normal position, and the pin 27 engages the stop lug 28 to limit the movement of the shaft under the action of the spring. On the other hand, when the rack bar 29 is lowered incident to the outward movement of the connecting rod 30 the pinion 12 and sleeve 11 are revolved in the opposite direction and the lug 23 on the sleeve engages the lug 22 on the collar 21 with the effect to revolve the other shaft 10 and swing the signal blade 17 thereon to vertical position, thus indicating the direction in which the vehicle is to be turned. In this rotation of the collar 21 the spring 26 associated therewith is placed under tension so as to restore the shaft and blade to normal position when the rack bar 29 is returned to its longitudinal position.

Upon the rotation of the sleeve 11 in either direction the shaft 14 is rotated in a corresponding direction through the medium of the beveled pinions 13 and 15 and when the lamp 16 is energized the light is projected in the direction that the vehicle is to take. In the present instance the operating mechanism for the rack bar 29 is connected with the steering gear of the vehicle so that the signal blades and lamp will be actuated in accordance with the movement of the steering wheel and this operating mechanism embodies a clamp 31 secured to the front axle of the vehicle at a point approximately centrally thereof. Fastened to the rear side of the clamp 31 is a horizontal bar 32 lying parallel with the front axle and having the rear edge thereof formed with a channel 33. Slidably mounted within the channel 33 is a guide block 34 equipped with an outwardly projecting pin 35 connected through the medium of a rod 36 with one of the steering knuckles of the vehicle. Fastened to the lower side of the clamp 31 is a blade 37 projecting rearwardly from the bracket and journaled in an opening formed in the rear end of the blade 37 is a pin 38 while secured to the upper end of the pin 38 is a horizontal bar 39 formed with a longitudinal slot 40 in which is mounted a pin 41 carried by a lug 42 secured to the block 34. Connected to the lower end of the pin 38 is an arm 43 extending outwardly from the pin and pivotally connected with one extremity of a horizontal connecting rod 44. 45 designates a bell crank lever pivoted to a suitable portion of the vehicle and having a horizontal member and a depending vertical member. The depending vertical member of the bell crank lever 45 is pivotally connected with the remaining end of the connecting rod 30.

In practice when the steering wheel of the vehicle is swung in one direction or the other a corresponding motion is imparted to the block 34 within the channel 33 in the bar 32 and in the sliding of the block 34 the pin 41 carried by the lug 42 rides within the slot 40 in the path 39 thereby rotating the pin 38 carried by the blade 37. In this rotation of the pin the connecting rod 44 and bell crank lever 45 transmit motion to the rod 30 to actuate the particular signal blade and rotate the lamp, as previously described.

In accordance with the modification shown in Fig. 8 the horizontal limb of the bell crank lever 45 may have one side thereof formed with a longitudinally extending slot 46 as illustrated in Fig. 8 of the drawings. Slidably mounted within this slot 46 is a block 47 equipped with a pin 48 to which the lower end of the connecting rod 30 is pivotally connected. A suitable spring 49 is also connected to the pin 48 and acts to hold the block 47 normally at the outer end of the groove 46. Connected to the block 47 is a draw bar 50 disposed within the groove 46 and pivotally connected to the rear end of the draw bar is one end of a link 51. Secured to the remaining end of the link 51 is a cable 52 or other flexible element trained over suitable guide sheaves and connected with the lower end of a lever 53 pivoted upon the floor of the vehicle within convenient reach of the foot of the driver. Secured to the upper end of the lever 53 is a pedal 54 whereby the lever may be quickly and conveniently swung whenever desired. By means of this construction it will be seen that as long as the block 47 is at the outer end of the groove 46, the rod 30 will be operated by the steering mechanism of the vehicle in the swinging of the steering wheel to turn the vehicle in one direction or the other. When, however, it is desired to render the signal blades and the lamp immovable irrespective of the swinging of the steering wheel, the lever 53 is swung in one direction and, through the medium of the cable 52, link 51 and draw bar 50, slides the block 47 toward the rear end of the grooves 46 whereby disposing the pin 48 in axial alinement with the pivot of the bell crank lever 45 so that the rod 30 will remain immovable during the swinging of the bell crank lever. Any suitable means may be employed for holding the lever 53 in actuated position.

While we have herein shown and described certain preferred forms of our invention by way of illustration, we wish it to be understood that we do not limit or confine ourselves to the precise details of construction herein described and delineated, but that modification and variation may be made within the scope of the claims and without departing from the spirit of the invention.

We claim:—

1. In a direction indicating apparatus for vehicles, spaced rotatable shafts disposed in axial alinement, a signal blade fixed on each shaft for rotation therewith, means interposed between the adjacent extremities of said shafts for independently rotating the latter in relatively reverse directions, and said means being operatively associated with the steering mechanism, whereby one of said shafts is operated upon turning of the steering wheel.

2. In a direction indicating apparatus for vehicles, rotatable shafts arranged end to end in axial alinement, a signal blade fixed to each shaft for rotation therewith, a rotatable element interposed between the adjacent ends of said shafts and in alinement therewith, said element coöperating with said shafts to independently rotate the latter in relatively reverse directions, and means for rotating said element in a direction to coöperate with either shaft.

3. In a direction indicating apparatus for vehicles, rotatable shafts, a signal blade fixed on each shaft for rotation therewith, means for independently rotating said shafts in relatively reverse directions according to the direction in which the vehicle is turned, said means being common to both shafts and under the control of the steering wheel, and means for restoring said shafts to normal position subsequent to being rotated.

4. In a direction indicating apparatus for vehicles, rotatable shafts, a signal blade fixed on each shaft for rotation therewith, means common to both shafts for independently rotating the latter in relatively reverse directions according to the direction in which the vehicle is turned, springs operating to automatically restore said shafts to normal position subsequent to being rotated, and means for limiting the movement of each shaft under the action of its respective spring.

5. In direction indicating apparatus for motor vehicles, horizontal shafts disposed in axial alinement and arranged transversely of the vehicle and placed end to end, signal blades on the outer ends of said shafts normally disposed in horizontal position and adapted to rotate to vertical position, a sleeve surrounding the meeting ends of said shafts, means for rotating said sleeve in one direction and in reverse direction, means for connecting said sleeve to one of said shafts to turn the latter when the sleeve is rotated in one direction and means for connecting said sleeve to the other shaft to turn the latter in the reverse direction when the direction of rotation of the sleeve is reversed.

6. In direction indicating apparatus for motor vehicles, horizontal shafts disposed in axial alinement and arranged transversely of the vehicle, and placed end to end, signal blades on the outer ends of said shafts normally disposed in horizontal position and adapted to rotate to vertical position, a sleeve surrounding the meeting ends of said shafts, means for rotating said sleeve in one direction and in the reverse direction, means for connecting said sleeve to one of said shafts to turn the latter when the sleeve is rotated in one direction, means for connecting said sleeve to the other shaft to turn the latter in the reverse direction when the direction of rotation of the sleeve is reversed, a vertical shaft, connections between said sleeve and said vertical shaft whereby the vertical shaft may be rotated in accordance with the sleeve and a lamp on the upper end of said vertical shaft.

7. In direction indicating apparatus for motor vehicles, horizontal shafts disposed in axial alinement and arranged transversely of the vehicle and placed end to end, signal blades on the outer ends of said shafts normally disposed in horizontal position and adapted to rotate to vertical position, a sleeve surrounding the meeting ends of said shafts, means for rotating said sleeve in one direction and in the reverse direction, means for connecting said sleeve to one of said shafts to turn the latter when the sleeve is rotated in one direction, means for connecting said sleeve to the other shaft to turn the latter in the reverse direction when the direction of rotation of the sleeve is reversed, and means for restoring said shafts to normal position.

8. In direction indicating apparatus for motor vehicles, signal blades operable respectively to indicate the direction of travel of the vehicle, means for operating said blades, means connecting said operating means to the steering gear of the vehicle whereby said operating means may be actuated from the steering gear in accordance with the turning of the vehicle, and means included to said connections whereby the latter may be rendered inactive upon said operating means.

9. In direction indicating apparatus for motor vehicles, signal blades operable respectively to indicate the direction of travel of the vehicle, means for operating said blades, means connecting said operating means to the steering gear of the vehicle whereby said operating means may be actuated from the steering gear in accordance with the turning of the vehicle, and foot control means included in said connection whereby the latter may be rendered inactive upon said operating means.

In testimony whereof we affix our signatures in presence of witnesses.

WILLIAM A. VINSON.
RODNEY N. McCLURE.

Witnesses as to William A. Vinson:
FLORA HALL,
W. A. BENEDICT.

Witnesses as to Rodney N. McClure:
STEPHEN MONTELEONE,
JOSEPH J. STEIN.